(12) United States Patent
Su et al.

(10) Patent No.: US 8,582,858 B2
(45) Date of Patent: Nov. 12, 2013

(54) METHOD AND APPARATUS FOR QUANTITATIVE ANALYSIS OF BREAST DENSITY MORPHOLOGY BASED ON MRI

(75) Inventors: Min-Ying Su, Irvine, CA (US); Ke Nie, Irvine, CA (US)

(73) Assignee: The Regents of the University of California, Oakland, CA (US)

( * ) Notice: Subject to any disclaimer, the term of this patent is extended or adjusted under 35 U.S.C. 154(b) by 426 days.

(21) Appl. No.: 12/970,738

(22) Filed: Dec. 16, 2010

(65) Prior Publication Data

US 2011/0150313 A1    Jun. 23, 2011

Related U.S. Application Data

(60) Provisional application No. 61/287,590, filed on Dec. 17, 2009.

(51) Int. Cl.
*G06K 9/00* (2006.01)

(52) U.S. Cl.
USPC .......................... 382/132; 382/128; 382/131

(58) Field of Classification Search
USPC .......... 382/100, 128–134, 224, 159, 164, 165, 382/171, 179, 227; 128/920; 700/57, 245; 703/2, 6, 11; 600/101, 109, 112, 114, 600/117–118, 139, 145, 173, 420, 424, 427, 600/434, 415–416, 562, 587; 606/1, 45, 606/130, 159; 378/37; 364/413
See application file for complete search history.

(56) References Cited

U.S. PATENT DOCUMENTS

| | | | | |
|---|---|---|---|---|
| 5,537,485 A * | 7/1996 | Nishikawa et al. | ........... | 382/130 |
| 6,266,435 B1 * | 7/2001 | Wang | ............... | 382/132 |
| 7,298,883 B2 * | 11/2007 | Giger et al. | ............... | 382/132 |
| 7,317,821 B2 * | 1/2008 | Chen et al. | ............... | 382/130 |
| 7,418,123 B2 * | 8/2008 | Giger et al. | ............... | 382/132 |
| 7,646,902 B2 * | 1/2010 | Chan et al. | ............... | 382/128 |
| 7,769,215 B2 * | 8/2010 | Horsch et al. | ............... | 382/128 |
| 8,391,574 B2 * | 3/2013 | Collins et al. | ............... | 382/128 |
| 2008/0159613 A1 * | 7/2008 | Luo et al. | ............... | 382/132 |
| 2011/0268338 A1 * | 11/2011 | Collins et al. | ............... | 382/131 |

* cited by examiner

*Primary Examiner* — Hadi Akhavannik
*Assistant Examiner* — Mehdi Rashidian
(74) *Attorney, Agent, or Firm* — Marcus C. Dawes; Daniel L. Dawes

(57) ABSTRACT

A method and apparatus configured to analyze breast density based on magnetic resonance imaging (MRI) of a breast of a patient includes the steps of segmenting an MR image of the breast from one set of three-dimensional breast MRI images, and analyzing the amount of dense tissue and the morphological distribution of the dense tissue and a data processor configured by software to perform these steps. Analyzing the amount of dense tissue and the morphological distribution of the dense tissue includes the steps of segmenting tissue data to separate breast tissue from other body tissue, separating tissue data of the dense and fatty tissues in the breast, and analyzing the morphological distribution of dense tissue in the breast to derive one or more three dimensional morphological parameters of the dense tissue distribution.

19 Claims, 10 Drawing Sheets

METHOD AND APPARATUS FOR QUANTITATIVE ANALYSIS OF BREAST DENSITY MORPHOLOGY BASED ON MRI

RELATED APPLICATIONS

The present application is related to U.S. Provisional Patent Application, Ser. No. 61/287,590, filed on Dec. 17, 2010, which is incorporated herein by reference and to which priority is claimed pursuant to 35 USC 119.

BACKGROUND OF THE INVENTION

1. Field of the Invention

The invention relates to methodologies to analyze breast density based on magnetic resonance imaging (MRI).

2. Description of the Prior Art

Mammary gland architecture may play an important role in determining the susceptibility of developing breast cancer. The most well-studied parameter is mammographic density, evaluated as the percentage of dense tissue area over the total breast area on mammograms. There are numerous studies reporting mammographic density as a strong risk factor; the higher the percentage, the higher the breast cancer risk. Increased density over time has also been shown to be associated with higher cancer incidence. There is also evidence suggesting that the relative distribution of adipose and fibroglandular tissue (referred as the breast parenchymal pattern in this specification) is involved in cancer development. The adipose tissue that is abundantly present around the ductal epithelium of the mammary gland may function as a slow release depot for lipid-soluble carcinogenic agents, and thus may affect cancer risk. However, the relationship between parenchymal pattern and cancer risk has never been reported, possibly due to the lack of both the imaging modality necessary to reveal the distribution pattern and the appropriate analysis methods.

Several studies have applied texture analysis to analyze the distribution pattern of the projected dense tissue on mammograms, and shown differences between women with invasive cancer and women without cancer. There are also differences between high-risk women carrying the BRCA1 and BRCA2 gene and low-risk women, which is possibly due to lobular branching promoted by these genes. Since the mammogram is a two-dimensional (two dimensional) projection image, texture analysis can be used to characterize the amount and/or the heterogeneity/homogeneity of dense tissue. However, as these features arise in part from the way that tissues overlap on the projected image, the analyzed parameters may be affected by different positioning of the breast and the degrees of compression.

What is needed is a three-dimensional imaging technique to reveal the respective distribution of the fatty and fibroglandular tissues. The investigation of the relationship between cancer risk and breast parenchymal pattern will only be meaningful when the parameters can be reliably measured. MRI provides three dimensional images of the breast, and that allows for the slice-by-slice segmentation of the fibroglandular and the fatty tissues for the evaluation of breast parenchymal pattern. To date, only a few studies have investigated the percent breast density using MRI, and the relative distribution pattern of the fatty and fibroglandular tissues has not yet been reported. The wealth of the three dimensional information that can be provided by MRI has yet to be fully explored. With the establishment of the American Cancer Society guidelines for annual MRI screening for high-risk women, many more clinical breast MRI examinations will be performed. Development of reliable methods to measure the extent of density and to characterize the parenchymal pattern may provide additional information contributing to a better management plan for these women.

BRIEF SUMMARY OF THE INVENTION

In the illustrated embodiment we disclose a method to study the morphology of fibroglandular tissue distribution using three-dimensional breast MRI, which is not subject to the tissue overlapping problem.

The illustrated embodiment of the invention is directed to a method to analyze breast density based on magnetic resonance imaging (MRI). Systems for analyzing breast density based on two-dimensional mammogram are commercially available. The disclosed method of the illustrated embodiments is based on MRI, which acquires three-dimensional images and can be used to analyze not only the amount of dense tissue, but also the morphological distribution of the dense tissue using automated computerized analysis of the MRI data. Breast density has been shown to predict the individual woman's risk of developing breast cancer.

While analysis systems for breast MRI have been previously devised, the main function is to display abnormal lesions, so what is needed is a system for analyzing the density of normal breast. This information may be used to provide a better management plan for patients receiving breast MRI.

In order to analyze the morphology of dense tissue in the breast, first a segmentation method to separate breast from the body is employed. Then computer algorithms are applied to separate the dense and fatty tissues in the breast in the MR image data. There is evidence in the literature that not only the amount of dense tissue but the relative distribution between the dense and fatty tissues may contribute to the development of breast cancer. The quantitative computerized method developed by us can be applied to analyze the morphological distribution of dense tissue in the breast, which has never been shown before.

In addition to four individual parameters (circularity, convexity, irregularity, and compactness), we further developed a composite score by combining these four parameters with different weightings. The morphology analysis algorithms, and the entire breast density segmentation and analysis system are novel. The advantage of the illustrated embodiments are that they can perform the entire procedure in an computer or data processor, starting from raw MR images. The system performs breast segmentation, dense tissue segmentation, and complete the analysis of dense tissue volume, percent density, as well as the morphological analysis. The analysis software reads the MR images from one study of the patient. The operator identifies a body landmark from the images, and the software automatically performs all segmentation procedures and gives a report to show all analyzed values as will be described below in greater detail.

In the illustrated embodiment four parameters, namely circularity, convexity, irregularity, and compactness, which are sensitive to the shape and margin of segmented fibroglandular tissue, were analyzed for 230 patients. Cases were assigned to one of two distinct parenchymal breast patterns: Intermingled pattern with intermixed fatty and fibroglandular tissue (Type I, N=141), and central pattern with confined fibroglandular tissue inside surrounded by fatty tissue outside (Type C, N=89). For each analyzed parameter, the differentiation between these two patterns was analyzed using a two-tailed t-test based on transformed parameters to no al distribution, as well as distribution histograms and receiver operator characteristic (ROC) analysis.

These two groups of patients were well matched both in age (50±11 vs 50±11) and in fibroglandular tissue volume (Type I: 104±62 cm$^3$ vs Type C: 112±73 cm$^3$). Between Type I and Type C breasts, all four morphological parameters showed significant differences that could be used to differentiate between the two breast types. In the ROC analysis, among all four parameters, the "compactness" could achieve the highest area under the curve of 0.84, and when all four parameters were combined, the AUC could be further increased to 0.94.

The results suggest that these morphological parameters analyzed from three dimensional MRI can be used to distinguish between intermingled and central dense tissue distribution patterns, and hence may be used to characterize breast parenchymal pattern quantitatively. The availability of these quantitative morphological parameters may facilitate the investigation of the relationship between parenchymal pattern and breast cancer risk.

More specifically the illustrated embodiments of the invention include a method to analyze breast density based on magnetic resonance imaging (MRI) of a breast of a patient comprising the steps of segmenting an MR image of the breast from one set of three-dimensional breast MRI images, and analyzing the amount of dense tissue and the morphological distribution of the dense tissue.

The step of analyzing the amount of dense tissue and the morphological distribution of the dense tissue further includes the step of analyzing the density of normal breast tissue to provide a management plan for patients receiving breast MRI or to predict the risk of developing breast cancer.

The step of analyzing the amount of dense tissue and the morphological distribution of the dense tissue includes segmenting tissue data to separate breast tissue from other body tissue, separating tissue data of the dense and fatty tissues in the breast, and analyzing the morphological distribution of dense tissue in the breast to derive one or more three dimensional morphological parameters of the dense tissue distribution.

The method further includes the step of generating a composite score by combining one or more three dimensional morphological parameters of the dense tissue distribution with different weightings.

The step of segmenting an MR image of the breast includes the step of starting from raw MR images.

The method further includes the step of performing breast segmentation, dense tissue segmentation, and complete the analysis of dense tissue volume, percent density, as well as the morphological analysis from one MRI study on a patient.

The method further includes the step of identifying a body landmark from the MR images, automatically performing all segmentation procedures, and generating a report to show all analyzed values.

The illustrated embodiment also includes a method for breast cancer treatment of a patient comprising the step of determining three dimensional morphological parameters of circularity; convexity, irregularity, and compactness of the breast tissue of the patient to characterize dense tissue distribution patterns based on three dimensional MRI data.

The method further includes the step of assessing cancer risk, predicting efficacy of chemoprevention drugs, or planning optimal breast treatment management.

The method further includes the step of quantitatively characterizing and distinguishing distribution patterns of the dense tissues in breast tissue having an intermingled pattern (Type I), and a central pattern (Type C).

The step of determining the three dimensional morphological parameter of circularity comprises determining $$\text{circularity} = V_{within}/V_{fibro}$$

where $V_{within}$ is the volume of fibroglandular tissue within the sphere of effective diameter $D_{eff} = 2 \times (3 \cdot V_{fibro}/4\pi)^{1/3}$ and $V_{fibro}$ is the total volume of fibroglandular tissue.

The step of determining circularity comprises identifying a centroid of fibroglandular tissue in the MRI of a breast, defining a sphere with diameter of $D_{eff}$ with respect to the centroid, measuring a volume of the fibroglandular tissues within the sphere, and determining a ratio of the volume of the fibroglandular tissues within the sphere to the total fibroglandular tissue within the breast to quantitatively define the circularity.

The step of determining the three dimensional morphological parameter of convexity comprises determining $$\text{convexity} = V_{fibro}/V_{convex},$$

where $V_{convex}$ is the volume of the minimum convex hull containing border voxels of the fibroglandular tissue identified using a gift wrapping algorithm and $V_{fibro}$ is the total volume of fibroglandular tissue.

The step of determining the three dimensional morphological parameter of irregularity comprises determining $$\text{irregularity} = 1 - \pi D_{eff}^2/S_{fibro},$$

where $S_{fibro}$ is the surface area of fibroglandular tissue, identifying a centroid of fibroglandular tissue in the MRI of a breast, defining a sphere with diameter of $D_{eff}$ with respect to the centroid, $D_{eff} = 2 \times (3 \cdot V_{fibro}/4\pi)^{1/3}$, and where $V_{fibro}$ is the total volume of fibroglandular tissue.

The step of determining the three dimensional morphological parameter of compactness comprises determining $$\text{compactness} = S_{fibro}^{3/2}/V_{fibro}$$

where $S_{fibro}$ is the surface area of fibroglandular tissue, and where $V_{fibro}$ is the total volume of fibroglandular tissue.

The method further includes the step of combining the three dimensional morphological parameters of circularity, convexity, irregularity, and compactness of the breast tissue of the patient to characterize dense tissue distribution patterns based on three dimensional MRI data to generate a single three dimensional morphological parameter to characterize dense tissue distribution patterns based on three dimensional MRI data.

The single three dimensional morphological parameter is generated by the computation of $0.3 + 0.8 \times \text{Circularity} + 0.7 \times \text{Convexity}^{1/2} - 0.2 \times \text{Irregularity}^{1/2} - 0.1 \times \text{Compactness}^{1/2}$.

The illustrated embodiments further include an apparatus to analyze breast density based on magnetic resonance imaging (MRI) of a breast of a patient comprising means or a data processor configured for segmenting an MR image of the breast from one set of three-dimensional breast MRI images; and means or configuration of the data processor for analyzing the amount of dense tissue and the morphological distribution of the dense tissue.

The means or data processor for analyzing the amount of dense tissue and the morphological distribution of the dense tissue comprises means for determining three dimensional morphological parameters of circularity, convexity, irregularity, and compactness of the breast tissue of the patient to characterize dense tissue distribution patterns based on three dimensional MRI data.

The means or data processor for determining three dimensional morphological parameters of circularity, convexity, irregularity, and compactness of the breast tissue of the patient further comprises means for combining the three dimensional morphological parameters of circularity, convexity, irregularity, and compactness of the breast tissue of the patient into a single three dimensional morphological parameter to characterize dense tissue distribution patterns based on three dimensional MRI data.

While the apparatus and method has or will be described for the sake of grammatical fluidity with functional explanations, it is to be expressly understood that the claims, unless expressly formulated under 35 USC 112, are not to be construed as necessarily limited in any way by the construction of "means" or "steps" limitations, but are to be accorded the full scope of the meaning and equivalents of the definition provided by the claims under the judicial doctrine of equivalents, and in the case where the claims are expressly formulated under 35 USC 112 are to be accorded full statutory equivalents under 35 USC 112. The invention can be better visualized by turning now to the following drawings wherein like elements are referenced by like numerals.

BRIEF DESCRIPTION OF THE DRAWINGS

FIG. 7a is an intermingled pattern with percent density=15.1% and irregularity index=0.74, ranking #190 in all 230 cases. FIG. 7b is a central pattern with percent density=15.6%, and a lower irregularity index=0.54, ranking #26 in all 230 cases.

FIG. 8a is an intermingled pattern with percent density=12.9% and compactness index=17.5, ranking #180 in all 230 cases. FIG. 8b is a central pattern with the percent density=11.8%, and a lower compactness index=6.7, ranking #32 in all 230 cases.

The invention and its various embodiments can now be better understood by turning to the following detailed description of the preferred embodiments which are presented as illustrated examples of the invention defined in the claims. It is expressly understood that the invention as defined by the claims may be broader than the illustrated embodiments described below.

DETAILED DESCRIPTION OF THE PREFERRED EMBODIMENTS

We have previously published an analysis method utilizing computer algorithms to segment the fibroglandular tissue for quantitative measurement of the percent density in the whole breast using MRI. In the illustrated embodiment we address a new question: In addition to the percent density, we use quantitative parameters to characterize the distribution pattern of the dense tissues. As an initial approach, we analyzed two distinct breast parenchymal patterns that can be classified visually: The intermingled pattern with intermixed fatty and fibroglandular tissues, and the central pattern with confined fibroglandular tissue inside surrounded by fatty tissue outside. Breasts from these two groups may have comparable percent densities, but differ in the distribution pattern of their dense tissue. Four different morphological parameters were calculated based on the three dimensional distribution pattern of segmented fibroglandular tissues, and their capacity to differentiate between the intermingled and the central patterns were evaluated using respective histograms and the receiver operating characteristic (ROC) analysis.

In medical imaging, the ROC analysis is commonly used for differentiating between malignant and benign tumors, with "sensitivity" as the ability to correctly diagnose malignant lesions and "specificity" as the ability to correctly diagnose benign lesions. In this specification, the ROC analysis is used to differentiate between two different breast parenchymal patterns shown on MRI, the central pattern (Type C) and the intermingled pattern (Type I), using the radiologist's reading as the ground truth; sensitivity referred to the ability to correctly diagnose Type I, and specificity referred to the ability to correctly diagnose Type C. In order to better understand the physical representation of the analyzed morphological parameters, cases with high and low index parameters were graphically depicted for visual comparison. The parameter that can differentiate between these two distinct patterns may then be used to provide a quantitative measure of parenchymal patterns, to facilitate the investigation of the relationship between parenchymal pattern and cancer risk.

Patient Database

Figures 1A, 1B, 1C:
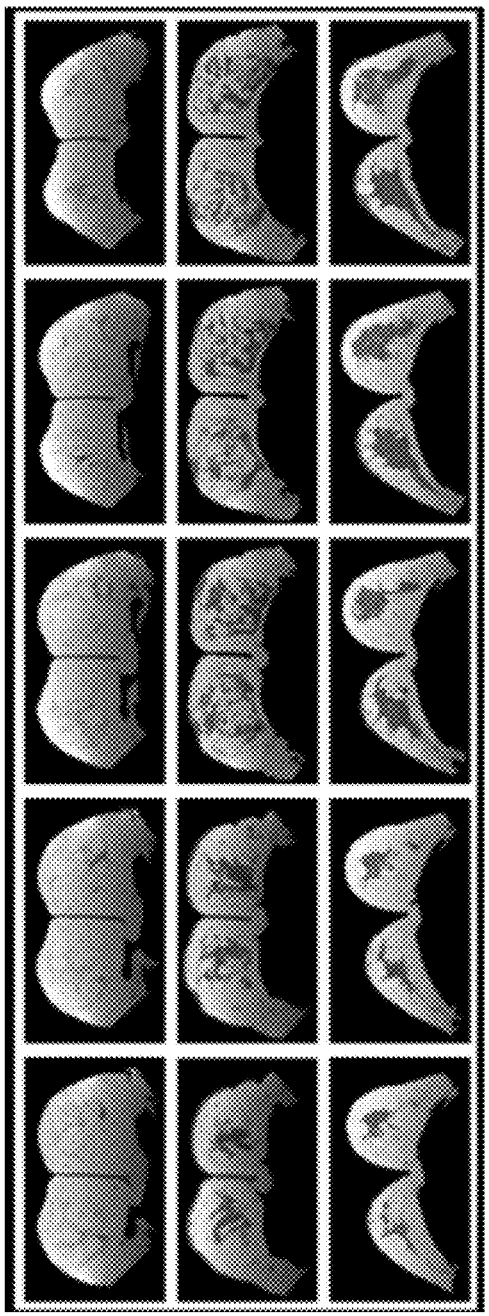
FIGS. 1a-1c a MRI images of three case examples, including one fatty breast (FIG. 1a), one Type I case (intermingled pattern, FIG. 1b), and one Type C case (central pattern, FIG. 1c). For each case, five axial view MR images from five imaging slices selected from superior to inferior directions are shown. There are no breast lesions on these images. The percent density is 5.4% for the fatty breast, 14.1% for the Type I case, and 13.9% for the Type C case.

In a review of our independent review board (IRB)-approved research breast MRI database from 2004 to 2006, 509 consecutive patients with either suspicious lesions or confirmed breast cancer were studied. Of these, 301 patients who had unilateral breast disease and for whom age and race information was available were included in this study. The radiology and pathology reports for each patient were reviewed to confirm that the disease was present in only one breast, and the breast density was only analyzed for the normal contralateral breast. Patients who had fatty breasts with the percent density <7% (N=71) as measured by MRI were classified as the fatty breast group. An example is shown in FIG. 1a. Since this group could easily be classified based on percent density alone, they were not included in morphology analysis. The remaining 230 patients were used for the analysis of breast parenchymal pattern.

The MRI studies were acquired using a Philips Eclipse 1.5T scanner. The images were acquired using a nonfat sat T1-weighted three dimensional SPGR (RF-FAST) pulse sequence, with TR=8.1 ms, TE=4.0 ms, flip angle=20°, matrix size=256×256, and field of view varying between 32 and 38 cm. A fixed number of 32 slices, each 4 nm thick, were used to cover the whole breasts. All 32 imaging slices were analyzed.

Classification of Breast Parenchymal Pattern to Type I Vs Type C

The parenchymal pattern of each case was classified into one of two types that are commonly seen on breast MRI: Type I, the intermingled pattern with mixed fatty and fibroglandular tissues, and Type C, the central pattern with confined fibroglandular tissue inside surrounded by fat outside. The criteria used to differentiate between the two patterns were as follows: The central pattern was assigned when (1) most of the fibroglandular tissue was centrally located and peripherally surrounded by fatty tissue, (2) the interface between fatty and dense tissues could either be smooth or irregular, and (3) a small amount of scattered fatty tissues could be present within the fibroglandular tissue. If the criteria for the central pattern were not met, the case was assigned to the intermingled pattern group. For extreme cases of the intermingled pattern, the fibroglandular and fatty tissues could be intermixed throughout the entire breast.

The parenchymal patterns of all cases were visually inspected twice by an experienced radiologist and once by an experienced physicist using the same criteria. They were blind to each other's assignments. Between the first and second reading of the radiologist, there were eight discrepant cases among 230 cases (3.5%). There were six discrepant cases (2.6%) between the physicist's reading and radiologist's first reading, and 14 discrepant cases (6%) between physicist's reading and radiologist's second reading. All discrepant cases were reviewed by both observers together to reach a consensus agreement, and this consensus assignment was used as the ground truth. Finally, of the 230 cases, N=141 was classified as Type I, and N=89 was classified as Type C. FIG. 1b shows a typical intermingled pattern (Type I), with mixed fibroglandular tissues and fatty tissues throughout the whole breast. FIG. 1c illustrates a typical example of Type C, showing confined fibroglandular tissue inside surrounded by fatty tissue outside.

Quantitative Assessment of Breast Parenchymal Patterns

The whole breast and the fibroglandular tissues were segmented on each slice using a computerized method. An initial cut of the breast region based on each individual woman's body landmarks was performed, and then the boundary of the breast was determined using clustering-based segmentation with the b-spline curve fitting to exclude chest wall muscle, followed by dynamic searching to exclude skin. Then, within the segmented breast, the adaptive fuzzy c-means clustering algorithm was applied to segment the fibroglandular tissues.

Figure 2A:
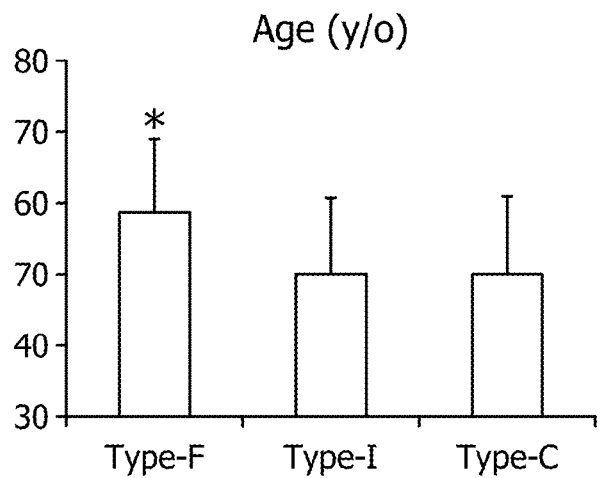
FIGS. 2a-2c are bar plots for comparing the age, fibroglandular tissue volume, and the percent density among three subject groups respectively. The fatty breast group (indicated as Type F) is significantly older, and has the smallest fibroglandular tissue volume and the lowest percent density compared to the intermingled type (Type I) and the central type (Type C). The Type I and Type C groups have comparable age, fibroglandular tissue volume, and the percent density, thus they cannot be separated based on these parameters.

Based on the segmentation results from all 32 slices, the total fibroglandular tissue volume and the percent density normalized to total breast volume were calculated. FIG. 2a shows the bar plot of the age, fibroglandular tissue volume, and the percent density of the three subject groups for comparison, which consist of fatty (N=71), Type I (N=141), and Type C (N=89) breasts. It can be seen that the fatty breast group is significantly older, and this group can be well separated from the other two groups based on the lower dense tissue volume or the lower percent density. However, breasts from the Type I and Type C groups have comparable age, dense tissue volume, and percent density, and thus cannot be separated.

Figure 3:
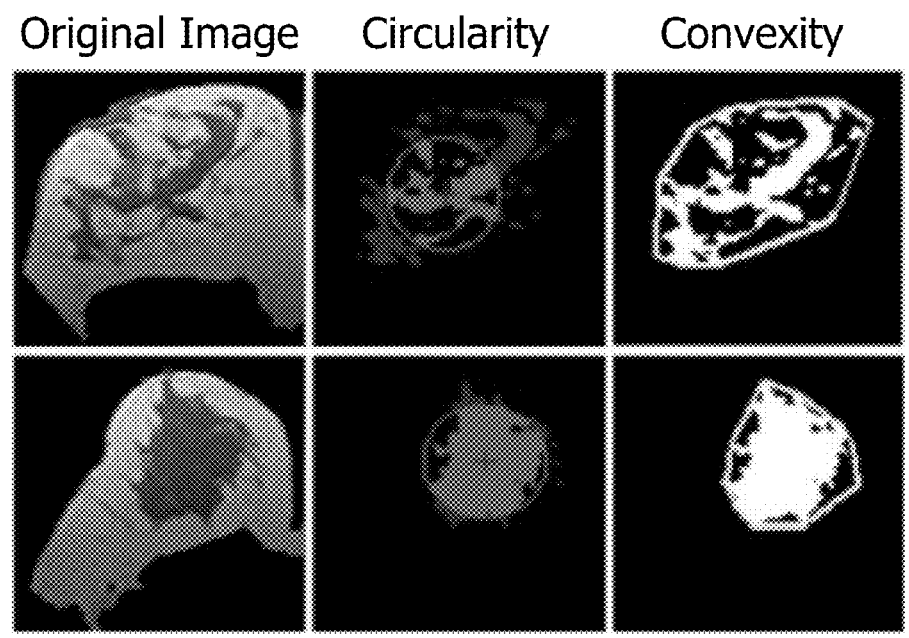
FIG. 3 is an illustration of the calculation of the circularity and the convexity index. Only one slice is shown as an example, but the analysis was performed in three dimensions. For circularity, a sphere with effective diameter $D_{eff}$ is drawn, and the ratio between the fibroglandular tissue volume within the sphere and the total fibroglandular tissue volume is calculated as the circularity index. The intermingled pattern (top) has a circularity index of 0.42 and the central pattern (bottom) has a higher index of 0.86. For convexity, the minimum convex hull is drawn, and the ratio between the total fibroglandular tissue volume and the convex hall volume is calculated as the convexity index. The Intermingled pattern (top) has a convexity index of 0.36 and the central pattern (bottom) has a higher index of 0.73.

In order to characterize the different morphological distribution patterns between Type I and Type C, we analyzed four morphological parameters that are sensitive to shape, namely circularity and convexity, and margin which is related to the ratio between the surface area and the total volume, irregularity and compactness for the segmented fibroglandular tissues. Circularity is defined as $$\text{Circularity} = V_{within}/V_{fibro},$$

where $V_{within}$ is the volume of fibroglandular tissue within the sphere of effective diameter $D_{eff}=2\times(3\cdot V_{fibro}/4\pi)^{1/3}$, and $V_{fibro}$ is the total volume of fibroglandular tissue, as illustrated in FIG. 3. The centroid of the fibroglandular tissues was first identified, and a sphere with diameter of $D_{eff}$ was drawn. The volume of the fibroglandular tissues within the sphere was measured, and the ratio to the total fibroglandular tissue was defined as the circularity. As shown in FIG. 3, the case with the central pattern has the $V_{within}$ close to the $V_{fibro}$ and hence has a higher circularity compared to the case with the intermingled pattern. A perfect sphere will have the highest circularity index of one.

Convexity is defined as $$\text{Convexity} = V_{fibro}/V_{convex},$$

where $V_{convex}$ is the volume of the minimum convex hull containing the border voxels of the fibroglandular tissue identified using the gift wrapping algorithm, as illustrated in FIG. 3. The gift wrapping algorithm is performed as follows: Starting from the leftmost vertex, at each step the polygon formed by three consecutive vertices is inspected. If the resulting angle is concave, then the middle point is discarded and the next vertex (along the polygon) is added for testing. If the angle is convex, then the process is repeated by moving to the next vertex. As shown in FIG. 3, the case with the central pattern has the convex volume closer to the fibroglandular tissue volume, and hence has a higher convexity index compared to the case with the intermingled pattern. A perfect sphere will have the highest convexity index of 1.

Irregularity is defined as $$\text{Irregularity} = 1 - \pi D_{eff}^2/S_{fibro},$$

where $S_{fibro}$ is the surface area of fibroglandular tissue. The irregularity index compares the total surface area to the surface area of a sphere with effective diameter $D_{eff}$. A perfect sphere will have the lowest irregularity index of zero.

Compactness is defined as $$\text{Compactness} = S_{fibro}^{3/2} / V_{fibro}.$$

The compactness is related to the ratio between the total surface area and the total volume. A sphere with smooth boundaries will have the lowest compactness index. A highly nonconvex pattern with rough boundaries will have a high compactness index.

Statistical Analysis

The distributions of each analyzed parameter in all patients were examined using the Kolmogorov-Smirnov test, and were transformed to normal distribution for statistical analysis. The parameters of age and circularity were already normally distributed, and did not need further transformation. The natural logarithm (ln) transformation was applied to fibroglandular tissue volume, while the square root (sqrt) transformation was applied to the parameters: percent density, convexity, irregularity, and compactness. Two-way analysis of variance was used to examine mean differences among the three parenchymal patterns of fatty, intermingled (Type I), and central (Type C) for age, (ln) fibroglandular tissue volume, and (sqrt) percent density. The ability of the four morphological parameters (circularity, convexity, irregularity, and compactness) to differentiate between the intermingled (Type I) and the central pattern (Type C) groups was first evaluated using a two-tailed t-test for the transformed parameters. For each morphological parameter, the values from all analyzed cases were ranked in order, and the distribution between the Type I and Type C patterns was plotted as histograms for comparison. Two cases with comparable densities, one with high index and one with low index (selected from the neighborhood of #35 and #195 ranking among all 230 cases), were graphically depicted as examples for visual inspection of their different parenchymal distribution patterns.

In addition to the individual analysis of each parameter, the linear regression model (enter method) using all four parameters together was applied to evaluate differences between the Type I and Type C patterns. The performance was evaluated using the ROC analysis with fourfold cross validation. All cases were first randomly assigned into four subcohorts, with each subcohort containing approximately the same proportion of Type C and Type cases. Three subcohorts were combined as the training set and the remaining subcohort was used as the validating set. For each training set, logistic model selection was applied to all four morphological features. The generated models were then applied to its corresponding validating set. Then, the determined diagnostic classifier could be used to predict a parenchymal pattern being Type I or Type C, based on the threshold level. The sensitivity was defined as the ability to correctly classify the intermingled pattern (Type I), while specificity was defined as the ability to correctly classify the central type (Type C). The sensitivity and specificity in the entire data set were calculated from a full range of thresholds (from 0.0-1.0 with an interval of 0.05), and then the ROC curve was constructed using all data points at different thresholds by plotting sensitivity verses one specificity. The area under the ROC curve (AUC) of all models were then listed in ascending order, and the one with the highest AUC was chosen. Finally, this model was applied to the entire cohort to obtain the final classification results. An analyses were performed using the SPSS 15.0 package (SPSS Inc., Chicago, Ill.).

Results—Age, Fibroglandular Tissue Volume, and Percent Density

Figure 2B:
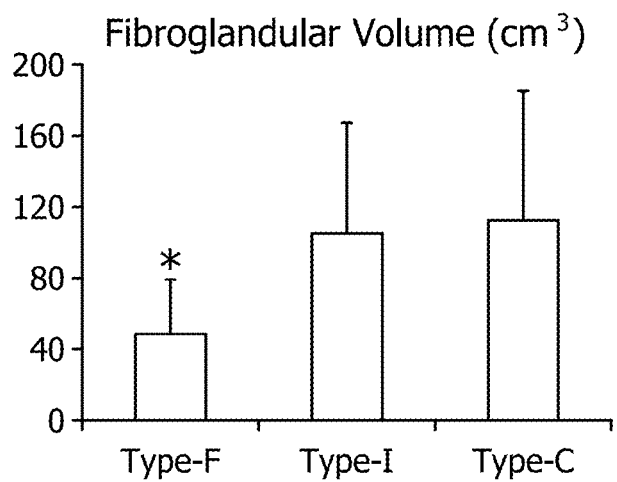
Figure 2C:
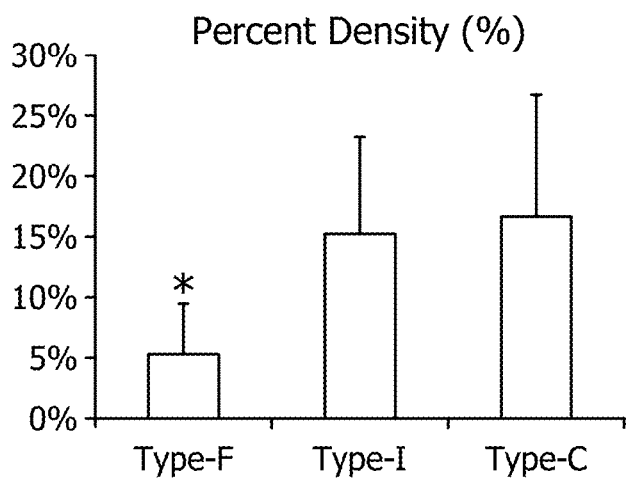

As shown in FIGS. 2a-2c, the fatty breast group could be easily separated from the Type I and Type C groups. They were significantly older in age (59±10 yr old), and had significantly lower fibroglandular tissue volume (48±31 cm$^3$) and lower percent density (5.2±4.4%). The mean age of patients was 50±11 yr old in the intermingled pattern (Type I) group and 50±11 yr old in the central pattern (Type C) group, so these two groups were well matched in age. The mean fibroglandular tissue volumes in these two groups were (Type I: 104±62 cm$^3$ vs Type C: 112±73 cm$^3$), and the percent densities were (Type I: 15.3±8.1% vs Type C: 16.7±10.1%). The density was slightly higher in the central pattern group, but the difference was not statistically significant.

Results—Morphological Parameters

The results of all density parameters calculated from the segmented fibroglandular tissues for Type I (intermingled) and Type C (central) cases are summarized in Table I. The four morphological parameters circularity, convexity, irregularity, and compactness all showed significant differences between the two patterns when comparing the transformed parameters (to the normal distribution) using the two-tailed t-test, suggesting that these features may be used to quantitatively characterize the parenchymal patterns. FIGS. 4a-4d show the relative distribution histograms of these four morphological features between Type I (intermingled) and Type C (central) groups. Different distribution curves in these two patterns were clearly noted. In order to better understand the link between these quantitative parameters and the physical representation of fibroglandular tissue distributions, the indices from all 230 cases were sorted in ascending order, and the cases with comparable percent density but with high ranking (#180-210/230) vs low ranking (#20-50/230) indices were selected for visual comparison.

Morphological Feature—Circularity

Figure 5A:
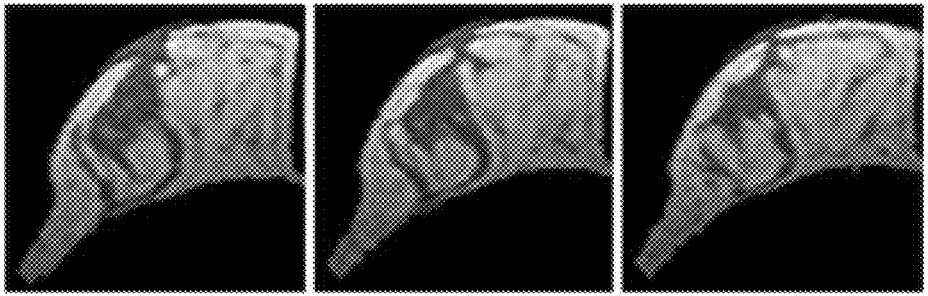
FIGS. 5a and 5b are MRI images illustrating that the circularity index is sensitive to the spherical vs nonspherical shapes. The FIG. 5a case is an intermingled pattern with percent density=9.6% and circularity index=0.29, ranking 33 in all 230 cases. The FIG. 5b case is a central pattern with a similar percent density=9.8%, and a higher circularity index=0.58, ranking 187 in all 230 cases.
Figure 5B:
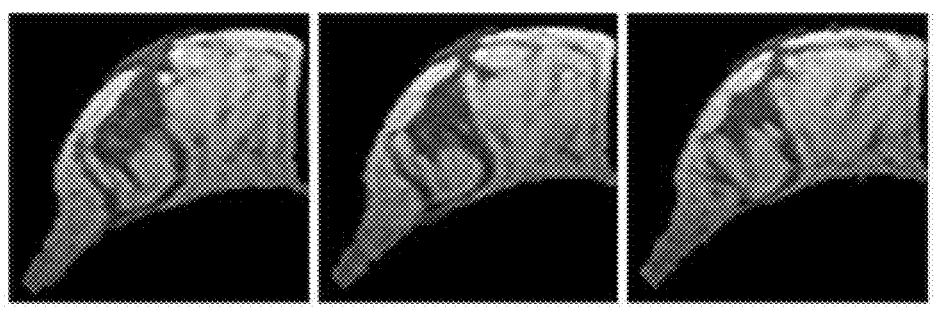

Two examples are demonstrated in FIGS. 5a and 5b to illustrate the circularity index, which is defined to analyze the shape of the distribution relative to a sphere of effective diameter. The two cases have similar percent densities (9.6% vs 9.8%) but different parenchymal distribution patterns. FIG. 5(a) shows a linearly structured fibroglandular pattern with a low circularity index=0.29 (ranking #33/230, Type I), and the FIG. 5(b) case shows a round fibroglandular region with a high circularity index=0.58 (ranking #187/230, Type C). In all 230 cases, the circularity index was significantly lower for the intermingled pattern than for the central pattern (0.36±0.13 vs 0.50±0.12, p<0.001).

Morphological Feature—Convexity

Figure 6A:
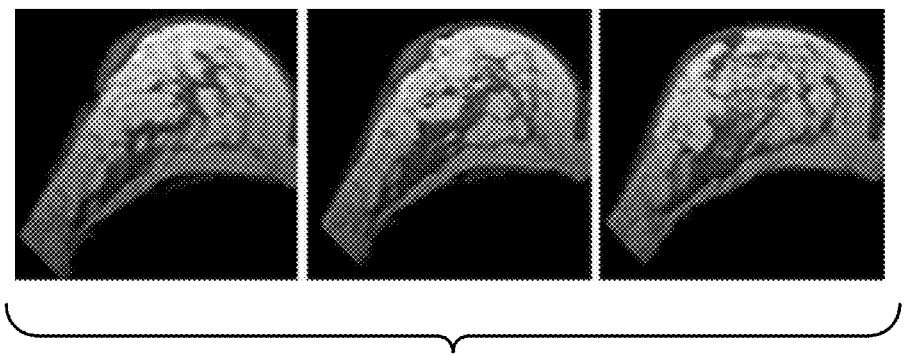
FIGS. 6a and 6b are MRI images which illustrate that the convexity index is sensitive to the convex vs concave shapes. The FIG. 6a case is an intermingled pattern with percent density=10.9% and convexity index=0.20, ranking #30 in all 230 cases. The FIG. 6b case is a central pattern with percent density=11.6%, and a higher convexity index=0.46, ranking #180 in all 230 cases.
Figure 6B:
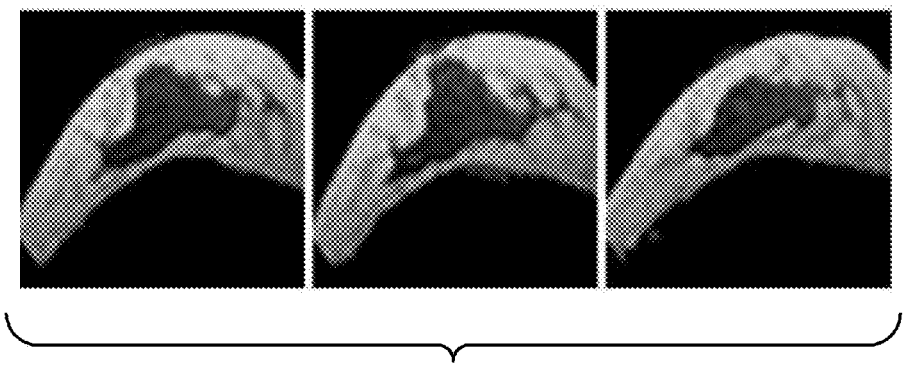

The convexity index is defined to analyze the shape with respect to the minimum convex hull containing the border voxels. Two examples are demonstrated in FIGS. 6a and 6b. In FIG. 6a the specimen with a low convexity index=0.20 (ranking #30/230, Type I), has a lower occupancy within the corresponding convex hulled area, while in FIG. 6b the specimen with a high convexity index=0.46 (ranking #180/230, Type C), has a higher occupancy. These two specimens have comparable percent densities (10.9% vs 11.6%). In all 230 cases, the convexity index was significantly lower for the intermingled pattern than for the central pattern (0.27(0.08 vs 0.38(0.10, p) 0.001).

Morphological Feature—Irregularity

Figure 7A:
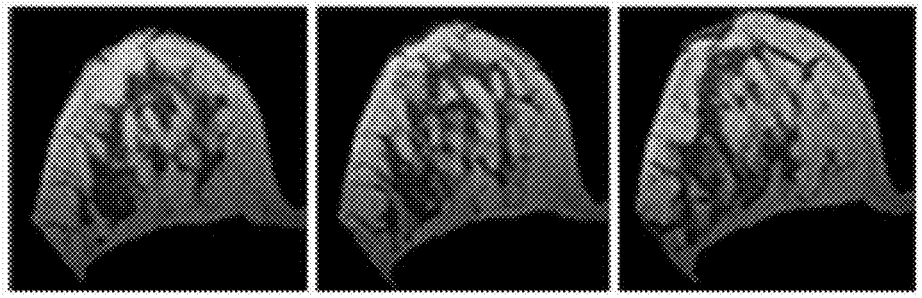
FIGS. 7a and 7b illustrate that the irregularity index is sensitive to the irregular vs smooth margins.
Figure 7B:
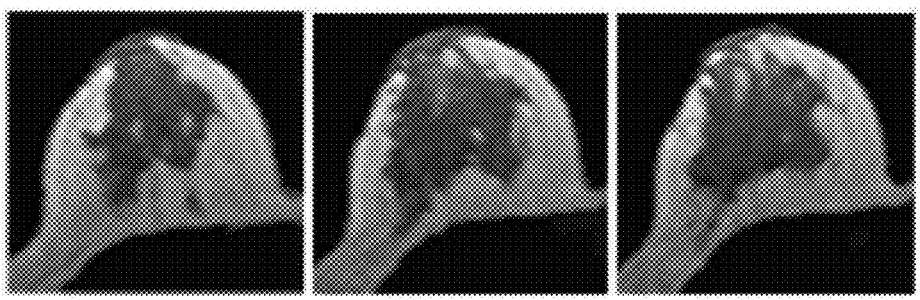

The irregularity index is defined to compare the total surface area to the surface area of a sphere with effective diameter $D_{eff}$. Two examples with high and low irregularity indices are shown in FIGS. 7a and 7b. They have similar percent densities (15.1% vs 15.6%) but different parenchymal distribution patterns. The case with a high irregularity index=0.74 (ranking #190/230) has an intermingled pattern showing an irregular border, and the case with a low irregularity index=0.54 (ranking #26/230) has a central pattern with a smooth border. In all 230 cases, the irregularity index was significantly higher for the intermingled pattern compared to the central pattern (0.69±0.07 vs 0.61±0.09, p<0.001).

Morphological Feature—Compactness

Figure 4A:
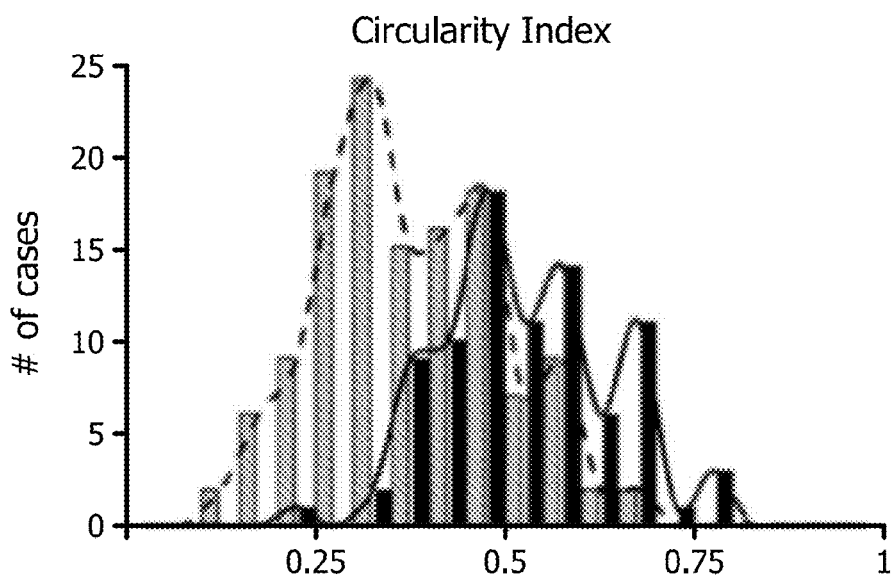
FIGS. 4a-4d are histograms of four morphological parameters differentiating the intermingled pattern (Type I, dashed curve) and the central pattern (Type C, solid curve), FIG. 4a—circularity index, FIG. 4b—convexity index, FIG. 4c—irregularity index, and FIG. 4d—compactness index. The intermingled pattern group has lower circularity and convexity, and higher irregularity and compactness compared to the central pattern group. The cases with high and low indices are illustrated in FIGS. 5-8.
Figure 4B:
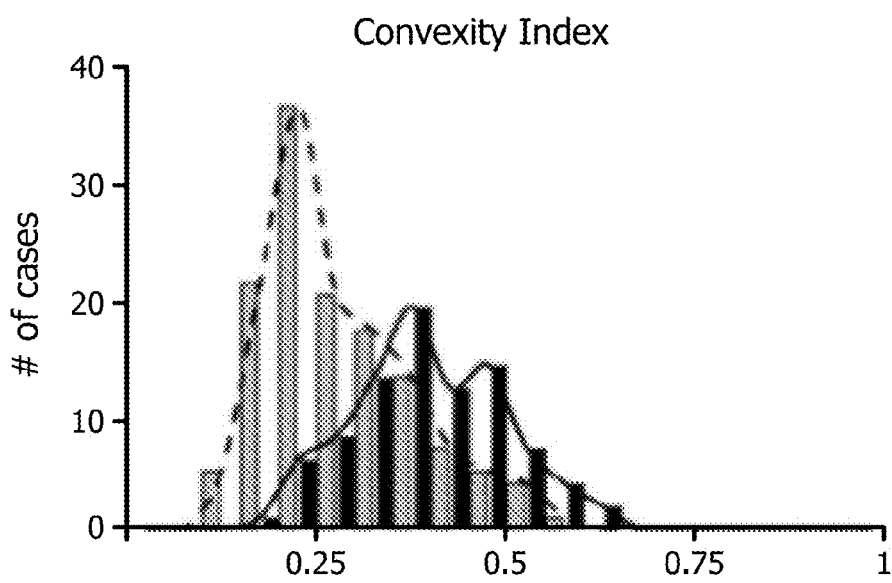
Figure 4C:
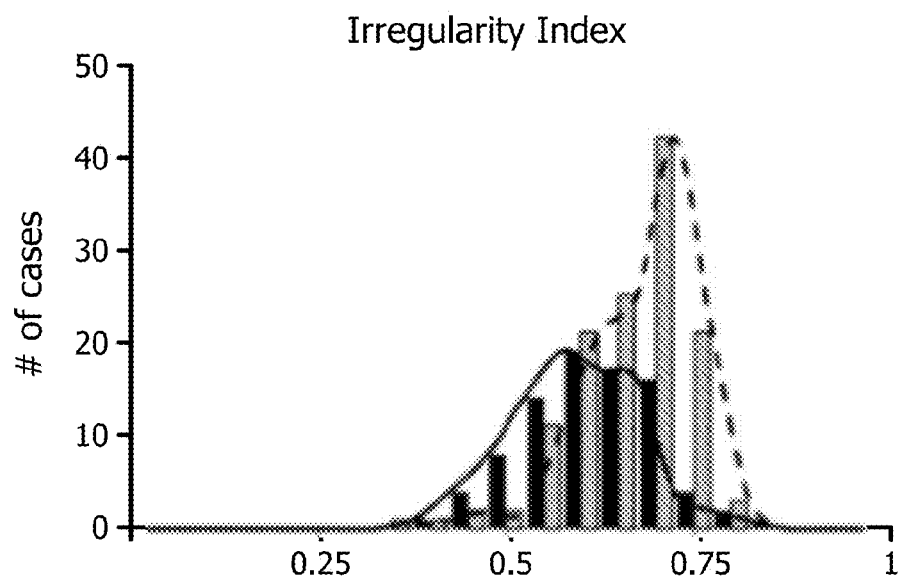
Figure 4D:
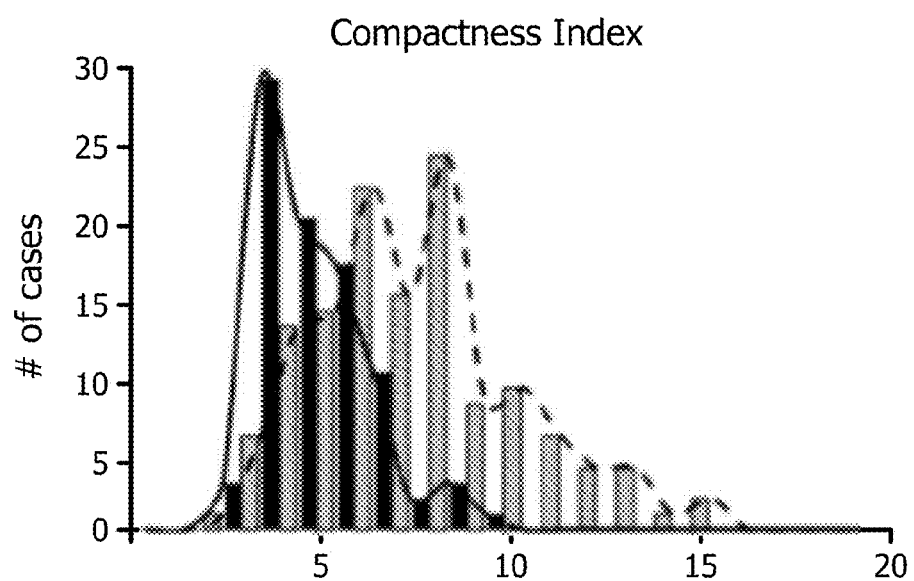
Figure 8A:
FIGS. 8a and 8b illustrate that the compactness index is sensitive to both shape and margin. Round shape with smooth margin has a relatively low compactness index.
Figure 8B:
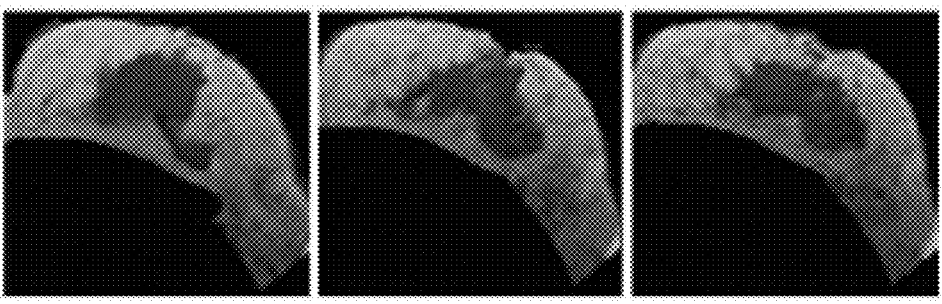

The compactness index is defined to compare the ratio between the total surface area and the total volume. Two cases with comparable percent densities (Type I: 12.9% vs Type C: 11.8%) are shown in FIGS. 8a-8b. The case with a high compactness index=17.5 (ranking #180/230) has an intermingled pattern, and the case with a low index=6.7 (ranking #32/230) has a central pattern. In all 230 cases, the compactness index was higher for the intermingled pattern than for the central pattern (14.2±5.2 vs 8.6±4.5, p<0.001). Among all four analyzed morphological parameters, the compactness index was the best parameter to differentiate between these two parenchymal patterns, and showed the widest separation between the histogram curves of these two groups, as shown in FIG. 4(d).

Group Differentiation Using Roc Analysis

The power of these four morphological parameters in differentiating between the Type I and Type C patterns was analyzed individually using ROC analysis. As suggested by the histogram analysis shown in FIGS. 4a-4d, the compactness index was the best single predictor among all four parameters, which attained the highest AUC of 0.84. These four parameters have distinctly different definitions, and in theory, they are sensitive to different aspects of the distribution. However, in reality, they are all related to shape and margin, and are highly correlated. When all four morphological parameters were combined together using the equation shown below, the AUC could be further increased to 0.94

$$0.3 + 0.8 \times \text{Circularity} + 0.7 \times \text{Convexity}^{1/2} - 0.2 \times \text{Irregularity}^{1/2} - 0.1 \times \text{Compactness}^{1/2}.$$

Figure 9:
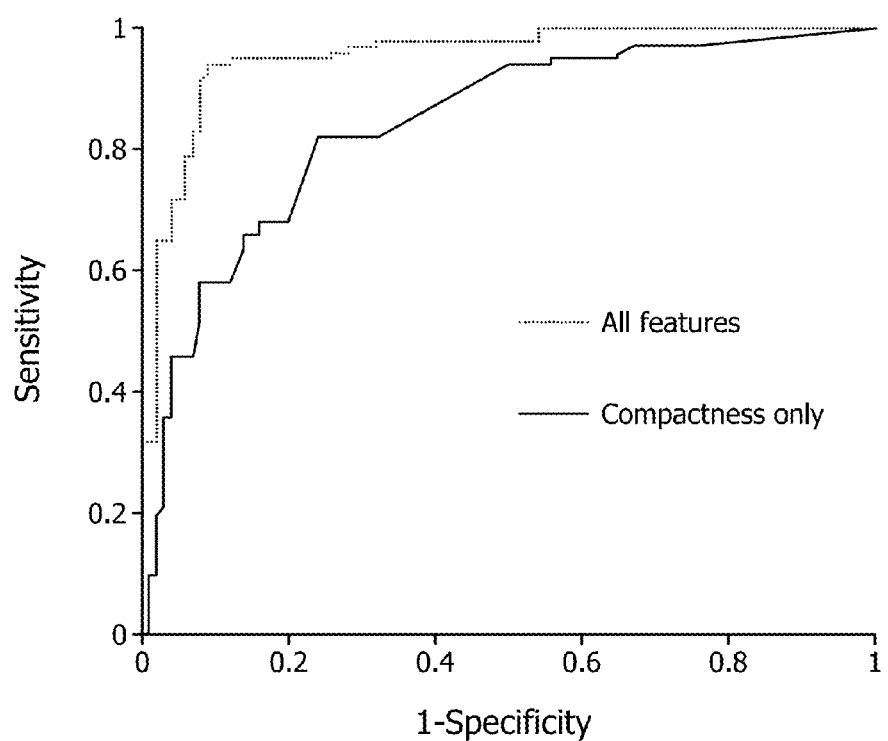
FIG. 9 is a graph of the ROC curves, showing sensitivity as a function of 1-specificity. When only using the compactness index the AUC is 0.84, and when using all four morphology parameters combined, the AUC is improved to 0.94.

A threshold value can be set to classify cases as either Type I or Type C, for example, a value less than 0.5 could represent Type I, while a value greater than 0.5 could represent Type C. The ROC curves can be generated using different threshold values, shown in FIG. 9. The results demonstrate that adding the other three parameters to the compactness index can further improve the AUC; therefore, they have a complementary role.

In this specification we disclosed an method of using quantitative morphological features to characterize the three dimensional distribution patterns of fibroglandular tissue. As an initial approach for validating the value of these quantitative morphological parameters, showed whether these parameters could differentiate between two distinct patterns (intermingled and central pattern) that could be easily separated visually. After excluding the 71 fatty breast cases with percent density <7%, there were a total of 230 remaining cases. The ground truth to separate them into Type I and Type C was carefully established. The densities (percentage and volume) in these two groups were similar, and the ages of the patients in these two groups were also well matched. All four analyzed morphological features showed significant differences between these two patterns, and when combined they could achieve an AUC of 0.94 in the ROC analysis. The intermingled pattern had significantly higher compactness and irregularity and lower circularity and convexity indices compared to those of the central pattern. The results strongly suggest that it is feasible to characterize different distribution patterns of fibroglandular tissues using quantitative morphological measures.

We further disclosed the association of the extracted quantitative features with the visual MRI representation of fibroglandular tissue distribution. Examples from cases with high vs low index are demonstrated graphically in FIGS. 5-8. The circularity and convexity indices were related to shape, while irregularity index was more sensitive to margin. The compactness index reflected the ratio between the surface area and the volume, and was associated with both shape and margin. Possibly due to its sensitivity to both shape and margin, the compactness had the greatest ability to differentiate between the intermingled and the central patterns. These results demonstrated that it is feasible to use quantitative parameters to describe the three dimensional density distribution on breast MRI.

Texture parameters are coma commonly used to analyze the density distribution on mammography. The analyzed texture information represents the amount and/or the heterogeneity/homogeneity of dense tissue distribution on mammograms. Because the texture parameters are analyzed on the projection image, one main contributing factor comes from the overlapping pattern of the dense and fatty tissues. For example, skewness can distinguish fatty tissues (positive value) from dense tissues (negative value). The prior art has introduced another two texture features, coarseness and contrast, to describe the spatial relationship between fatty and dense tissues. There was evidence suggesting that the distribution of fibroglandular tissue is associated with cancer risk. Prior art practitioners have used texture features to compare between the high-risk BRCA1/BRCA2 mutation carriers and low-risk women, and found that the BRCA1/BRCA2 mutation carriers tend to have more heterogeneously dense tissues (high coarseness and low contrast). Very recently, a systematic study has been published to assess breast tissue texture using Markovian cooccurrence matrices, run-length analysis, Laws features, wavelet decomposition, and Fourier analysis. Following a comprehensive evaluation of a large community-based screening population of approximately 750 women, they have reported that the analyzed texture features predicted breast cancer risk at the same magnitude as did the percent breast density. The texture features at low spatial frequencies (i.e., coarser mammographic textures) were found to be the strongest predictors of breast cancer risk. However, we also note that numerical values of texture features tend to vary with differences in acquisition variables such as compression force, angle, kVp, etc.

We would like to point out that the density analyzed based on mammogram cannot be generalized to predict the results analyzed from MRI. The density measurements by MRI and mammography have been shown highly correlated. However, all these studies also consistently showed that the mammographic density was higher than the density measured on MRI, which was attributed to two-dimensional vs three-dimensional image acquisitions. Mammography only acquires one projection image, and is not sufficient for analyzing the relative spatial distribution of dense and fatty tissues. On the other hand, MRI provides detailed three dimensional distribution patterns of fibroglandular tissue, hence not subject to the issue of tissue overlapping. Therefore, although both modalities show contrast between dense and fatty tissues, the texture results analyzed from mammography cannot be directly compared to the parenchymal patterns analyzed from dense tissue morphology on MRI. In fact, we have also performed texture analysis using gray level co-occurrence matrix and Laws texture features on MR images, but found them inferior to the morphology analysis reported here to differentiate between Type I and Type C. In texture analysis, the entire image is analyzed, and a major part of the measured texture parameters is derived from the amount of fatty issue contained within the image, which is not of our interest. The morphology analysis approach used in the illustrated embodiment is based on segmented fibroglandular tissue, and this provides much more specific information when compared to blind texture analysis.

It has been reported that the distribution of the mammary gland is associated with the development breast cancer. For example, the BRCA1 and BRCA2 genes promote lobular branching, and the resulting denser and more heterogeneous breast parenchyma leads to increased cancer risk. The risk for breast cancer associated with mammographic density may be explained by the combined effects of mitogens (which influence cell proliferation and the size of the cell population in the breast) and mutagens (which influence the likelihood of genetic damage to those cells). Fatty tissue has been demonstrated to have the ability to generate products to augment the growth of mammary carcinoma cells. Having more surface interaction between the fibroglandular and fatty tissue may be related to increased breast cancer risk by releasing lipid-soluble carcinogens into the intimate fibroglandular tissue. It is reasonable to expect that the intermingled pattern shown on MRI is more likely to show a heterogeneous pattern on two dimensional mammograms. Similar as the concept of using texture analysis on mammogram to correlate with risk, the MRI-based analysis technique that we reported in this specification has the potential to facilitate the investigation of the relationship between breast parenchymal pattern and cancer risk. We have provided strong evidence to demonstrate that the four analyzed parameters can differentiate between the central pattern and the intermingled pattern. No other group has ever reported on the analysis of breast density morphology based on MRI.

There are several cautions to be noted in this study. First, the data sets were from a research MRI database, therefore, at is not representing a general population. However, our purpose is to develop quantitative measures to distinguish between these two patterns (Type I and Type C), and as long as we have a good case number for each group, the data set can be used to test how well the quantitative parameters analyzed in this study can differentiate between these two groups.

Second, we did not analyze the fatty breast cases. As shown in FIGS. 1a-1c, since the contrast between fibroglandular and fatty tissues is not strong, the segmentation of the fibroglandular tissue may not be reliable for performing further morphology analysis. On the other hand, the fatty breasts can be easily classified based on the percent density alone, so further morphology analysis may not be needed.

Third, the ground truth was established using visual inspection, which is subject to variations of observers. To minimize this observer bias, we had a total of three reading sessions by two observers (a radiologist and a physicist), and any case that had discrepant assignments among three readings was discussed to reach a consensus.

Fourth, the best classifier combining all four morphological parameters was obtained using fourfold cross validation within the same data set, not from independent training and validation data sets. To reduce variability, multiple rounds of cross-validation were performed using different partitions, and the validation results were averaged over the rounds. If an independent data set is available, we can further test the ability of each individual parameter and the combined classifier shown in Eq. (1) to differentiate between Type I and Type C patterns.

In summary, the illustrated embodiment demonstrates that the four morphological parameters (circularity, convexity, irregularity, and compactness) can be used to characterize dense tissue distribution patterns based on MRI, and they can be used to investigate the relationship between parenchymal pattern and the cancer risk. For example, between two women who have similar percent density, but have differing parenchymal patterns (e.g., central type vs mixed type), who will have a higher risk of developing cancer? Our method to characterize the morphology of the fibroglandular tissues provides an essential foundation for such research in the future. Breast density is a well-established risk factor, and a consensus has been reached by the Breast Cancer Prevention Collaborative Group to incorporate quantitative breast density into risk models. The change in breast density has also been shown to be a good surrogate marker for predicting the efficacy of chemoprevention drugs. In the future when the role of the morphological breast density features is established, they may also be incorporated into the risk models to further improve the accuracy in predicting each individual woman's cancer risk, for making a decision about the optimal management plan.

Many alterations and modifications may be made by those having ordinary skill in the art without departing from the spirit and scope of the invention. Therefore, it must be understood that the illustrated embodiment has been set forth only for the purposes of example and that it should not be taken as limiting the invention as defined by the following invention and its various embodiments.

Therefore, it must be understood that the illustrated embodiment has been set forth only for the purposes of example and that it should not be taken as limiting the invention as defined by the following claims. For example, notwithstanding the fact that the elements of a claim are set forth below in a certain combination, it must be expressly understood that the invention includes other combinations of fewer, more or different elements, which are disclosed in above even when not initially claimed in such combinations. A teaching that two elements are combined in a claimed combination is further to be understood as also allowing for a claimed combination in which the two elements are not combined with each other, but may be used alone or combined in other combinations. The excision of any disclosed element of the invention is explicitly contemplated as within the scope of the invention.

The words used in this specification to describe the invention and its various embodiments are to be understood not only in the sense of their commonly defined meanings, but to include by special definition in this specification structure, material or acts beyond the scope of the commonly defined meanings. Thus if an element can be understood in the context of this specification as including more than one meaning, then its use in a claim must be understood as being generic to all possible meanings supported by the specification and by the word itself.

The definitions of the words or elements of the following claims are, therefore, defined in this specification to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a subcombination or variation of a subcombination.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptionally equivalent, what can be obviously substituted and also what essentially incorporates the essential idea of the invention.

We claim:

1. A method to analyze breast density based on magnetic resonance imaging (MRI) of a breast of a patient comprising:
    segmenting an MR image of the breast from one set of three-dimensional breast MRI images;
    determining the three dimensional morphological parameter of compactness of the breast tissue of the patient wherein compactness=$S_{fibro}^{3/2}/V_{fibro}$, where $S_{fibro}$ is the surface area of fibroglandular tissue and where $V_{fibro}$ is the total volume of fibroglandular tissue; and
    analyzing the amount of dense tissue and the morphological distribution of the dense tissue.

2. The method of claim 1 where analyzing the amount of dense tissue and the morphological distribution of the dense tissue further comprises analyzing the density of normal breast tissue to provide a management plan for patients receiving breast MRI or to predict the risk of developing breast cancer.

3. The method of claim 1 where analyzing the amount of dense tissue and the morphological distribution of the dense tissue comprises: segmenting tissue data to separate breast tissue from other body tissue; separating tissue data of the dense and fatty tissues in the breast; and analyzing the morphological distribution of dense tissue in the breast to derive one or more three dimensional morphological parameters of the dense tissue distribution.

4. The method of claim 3 further comprising generating a composite score by combining one or more three dimensional morphological parameters of the dense tissue distribution with different weightings.

5. The method of claim 1 where segmenting an MR image of the breast comprises starting from raw MR images.

6. The method of claim 1 further comprising performing breast segmentation, dense tissue segmentation, and complete the analysis of dense tissue volume, percent density, as well as the morphological analysis from one MRI study on a patient.

7. The method of claim 1 further comprising identifying a body landmark from the MR images, automatically performing all segmentation procedures, and generating a report to show all analyzed values.

8. A method for breast cancer treatment of a patient comprising determining three dimensional morphological parameters of circularity, convexity, irregularity, and compactness of the breast tissue of the patient to characterize dense tissue distribution patterns based on three dimensional MRI data,
    wherein determining compactness=$S_{fibro}^{3/2}/V_{fibro}$
    where $S_{fibro}$ is the surface area of fibroglandular tissue and where $V_{fibro}$ is the total volume of fibroqlandular tissue.

9. The method of claim 8 further comprising assessing cancer risk, predicting efficacy of chemoprevention drugs, or planning optimal breast treatment management.

10. The method of claim 8 further comprising quantitatively characterizing and distinguishing distribution patterns of the dense tissues in breast tissue having an intermingled pattern (Type I), and a central pattern (Type C).

11. The method of claim 8 where determining the three dimensional morphological parameter of circularity comprises determining $$\text{circularity}=V_{within}/V_{fibro},$$

where $V_{within}$ the volume of fibroglandular tissue within the sphere of effective diameter $D_{eff}=2\times(3\cdot V_{fibro}/4\pi)^{1/3}$, and $V_{fibro}$ is the total volume of fibroglandular tissue.

12. The method of claim 11 where determining circularity comprises identifying a centroid of fibroglandular tissue in the MRI of a breast, defining a sphere with diameter of $D_{eff}$ with respect to the centroid, measuring a volume of the fibroglandular tissues within the sphere, and determining a ratio of the volume of the fibroglandular tissues within the sphere to the total fibroglandular tissue within the breast to quantitatively define the circularity.

13. The method of claim 8 where determining the three dimensional morphological parameter of convexity comprises determining $$\text{convexity}=V_{fibro}/V_{convex},$$

where $V_{convex}$ is the volume of the minimum convex hull containing border voxels of the fibroglandular tissue identified using a gift wrapping algorithm and $V_{fibro}$ is the total volume of fibroglandular tissue.

14. The method of claim 8 where determining the three dimensional morphological parameter of irregularity comprises determining $$\text{irregularity}=1-\pi D_{eff}^2/S_{fibro},$$

where $S_{fibro}$ is the surface area of fibroglandular tissue, identifying a centroid of fibroglandular tissue in the MRI of a breast, defining a sphere with diameter of $D_{eff}$ with respect to the centroid, $D_{eff}=2\times(3\cdot V_{fibro}/4\pi)^{1/3}$, and where $V_{fibro}$ is the total volume of fibroglandular tissue.

15. The method of claim 9 further comprising combining the three dimensional morphological parameters of circularity, convexity, irregularity, and compactness of the breast tissue of the patient to characterize dense tissue distribution patterns based on three dimensional MRI data to generate a single three dimensional morphological parameter to characterize dense tissue distribution patterns based on three dimensional MRI data.

16. The method of claim 15 where single three dimensional morphological parameter is generated by $$0.3+0.8\times\text{Circularity}+0.7\times\text{Convexity}^{1/2}-0.2\times\text{Irregularity}^{1/2}-0.1\times\text{Compactness}^{1/2}.$$

17. An apparatus to analyze breast density based on magnetic resonance imaging (MRI) of a breast of a patient comprising:
    means for segmenting an MR image of the breast from one set of three-dimensional breast MRI images; and
    means for analyzing the amount of dense tissue and the morphological distribution of the dense tissue,
    wherein said means for analyzing the amount of dense tissue and the morphological distribution of the dense tissue comprises means for determining the three dimensional morphological parameter of compactness of the breast tissue of the patient to characterize dense tissue distribution patterns based on three dimensional MRI data, wherein determining compactness=$S_{fibro}^{3/2}/V_{fibro}$ where $S_{fibro}$ is the surface area of fibroglandular tissue and where $V_{fibro}$ is the total volume of fibroglandular tissue.

18. The apparatus of claim 17 where the means for analyzing the amount of dense tissue and the morphological distribution of the dense tissue further comprises means for determining three dimensional morphological parameters of circularity, convexity, and irregularity of the breast tissue of the patient to characterize dense tissue distribution patterns based on three dimensional MRI data.

19. The apparatus of claim 18 further comprising means for combining the three dimensional morphological parameters of circularity, convexity, irregularity, and compactness of the breast tissue of the patient into a single three dimensional morphological parameter to characterize dense tissue distribution patterns based on three dimensional MRI data.

* * * * *